United States Patent
Okamoto et al.

(10) Patent No.: US 10,509,674 B2
(45) Date of Patent: Dec. 17, 2019

(54) SOFTWARE COMPONENT ASSIGNING SYSTEM FOR VEHICLE

(71) Applicant: TOYOTA JIDOSHA KABUSHIKI KAISHA, Toyota-shi, Aichi-ken (JP)

(72) Inventors: Satoshi Okamoto, Shizuoka-ken (JP); Shogo Sekizawa, Miyoshi (JP); Yuta Ochiai, Yokohama (JP); Kosuke Kaji, Numazu (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 318 days.

(21) Appl. No.: 15/465,013

(22) Filed: Mar. 21, 2017

(65) Prior Publication Data

US 2017/0277566 A1    Sep. 28, 2017

(30) Foreign Application Priority Data

Mar. 24, 2016 (JP) ................................ 2016-059610

(51) Int. Cl.
*G06F 11/07* (2006.01)
*G06F 9/50* (2006.01)
(Continued)

(52) U.S. Cl.
CPC .......... *G06F 9/5011* (2013.01); *G06F 11/006* (2013.01); *G06F 11/0739* (2013.01); *H04L 67/12* (2013.01); *H04L 67/34* (2013.01)

(58) Field of Classification Search
CPC .................................................. G06F 11/0739
See application file for complete search history.

(56) References Cited

U.S. PATENT DOCUMENTS 5,491,631 A * 2/1996 Shirane ............... F02D 41/22
                                                    123/479
6,463,373 B2 * 10/2002 Suganuma .......... B60R 16/0232
                                                    303/112
(Continued)

FOREIGN PATENT DOCUMENTS

| JP | 2008-254484 A | 10/2008 |
| JP | 2013-143093 A | 7/2013 |
| JP | 2013-237311 A | 11/2013 |

OTHER PUBLICATIONS

Meedeniya, Indika, Aldeida Aleti, and Lars Grunske. "Architecture-driven reliability optimization with uncertain model parameters." Journal of Systems and Software 85.10 (2012): 2340-2355. (Year: 2012).*

(Continued)

*Primary Examiner* — Matthew J Brophy
(74) *Attorney, Agent, or Firm* — Sughrue Mion, PLLC

(57) ABSTRACT

A software component assigning system for a vehicle includes electronic control units connected to a common network in the vehicle, one of the electronic control units being an integrated control electronic control unit which is configured to: acquire a first rank value of each of the electronic control units, the first rank value becoming higher as a probability of occurrence of a malfunction is higher; acquire a second rank value of an additional software component that is additionally arranged in any one of the electronic control units, the second rank value becoming higher as a level of importance; and decide an electronic control unit to arrange the additional software component from among the electronic control units such that the additional software component is arranged in the electronic control unit of which the first rank value is lower as the second rank value of the additional software component is higher.

11 Claims, 12 Drawing Sheets

(51) Int. Cl.
*H04L 29/08* (2006.01)
*G06F 11/00* (2006.01)

(56) References Cited

U.S. PATENT DOCUMENTS

| | | | | |
|---|---|---|---|---|
| 8,509,963 | B1* | 8/2013 | Barnes | G06F 11/3013 340/540 |
| 8,577,663 | B2* | 11/2013 | Lu | G05B 23/0235 703/13 |
| 8,732,112 | B2* | 5/2014 | Singh | G07C 5/0816 706/51 |
| 8,958,927 | B2* | 2/2015 | Tsuchida | G06F 11/0739 701/1 |
| 9,142,066 | B2* | 9/2015 | Chen | G06F 16/243 |
| 9,569,295 | B2* | 2/2017 | Guenkova-Luy | G06F 11/0739 |
| 9,832,283 | B2* | 11/2017 | Godfrey | H04W 4/70 |
| 2002/0099487 | A1* | 7/2002 | Suganuma | B60R 16/0232 701/48 |
| 2004/0034504 | A1* | 2/2004 | Ulrich | F02D 41/22 702/181 |
| 2004/0088087 | A1* | 5/2004 | Fukushima | B60R 16/0231 701/29.6 |
| 2006/0101465 | A1* | 5/2006 | Kato | G05B 19/0421 718/100 |
| 2006/0259208 | A1* | 11/2006 | Ota | G11C 16/22 701/1 |
| 2009/0300430 | A1* | 12/2009 | Nissan-Messing | G06F 11/0739 714/48 |
| 2010/0281134 | A1* | 11/2010 | Melen | G06F 11/0739 709/217 |
| 2012/0210160 | A1* | 8/2012 | Fuhrman | G05B 19/0428 714/4.12 |
| 2012/0303348 | A1* | 11/2012 | Lu | G05B 23/0235 703/13 |
| 2013/0018885 | A1* | 1/2013 | Guenkova-Luy | G06F 11/0739 707/737 |
| 2013/0151082 | A1* | 6/2013 | Preston | B60R 25/00 701/45 |
| 2013/0159240 | A1* | 6/2013 | Singh | G05B 23/0275 706/51 |
| 2013/0274991 | A1* | 10/2013 | Cheriere | G06F 11/008 701/32.9 |
| 2013/0274992 | A1* | 10/2013 | Cheriere | B64F 5/40 701/32.9 |
| 2014/0188772 | A1* | 7/2014 | Garvey | G05B 23/024 706/46 |
| 2014/0189441 | A1* | 7/2014 | Ishida | G06F 11/3006 714/47.3 |
| 2014/0288728 | A1* | 9/2014 | Tsuchida | G06F 11/0739 701/1 |
| 2014/0376587 | A1* | 12/2014 | Sakashita | B60W 10/08 374/1 |
| 2017/0052787 | A1* | 2/2017 | Koike | G06F 11/30 |
| 2017/0106791 | A1* | 4/2017 | Li | G01C 21/3697 |
| 2017/0153644 | A1* | 6/2017 | Otsuka | B60W 50/02 |
| 2017/0199681 | A1* | 7/2017 | Jain | G06F 3/0616 |

OTHER PUBLICATIONS

Meedeniya, Indika, et al. "Architecture-driven reliability and energy optimization for complex embedded systems." International Conference on the Quality of Software Architectures. Springer, Berlin, Heidelberg, 2010. (Year: 2010).*

Nilsson, Dennis K., Phu H. Phung, and Ulf E. Larson. "Vehicle ECU classification based on safety-security characteristics." (2008): 102-102. (Year: 2008).*

Qin, Feng, et al. "Rx: treating bugs as allergies—a safe method to survive software failures." Acm sigops operating systems review. vol. 39. No. 5. ACM, 2005. (Year: 2005).*

* cited by examiner

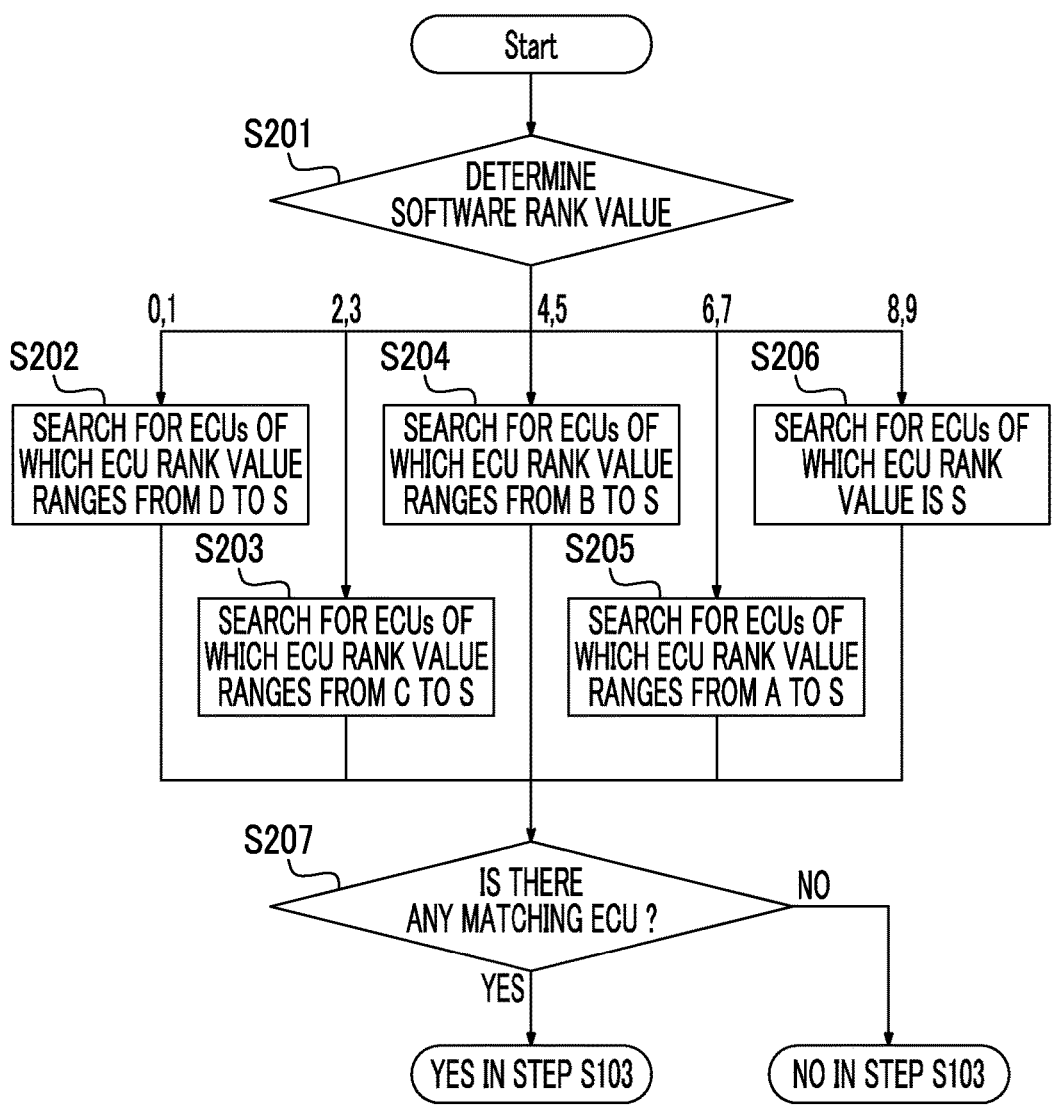

FIG. 4

| LEVEL OF IMPORTANCE | | |
|---|---|---|
| HIGH ↑ | 9 | THERE IS POSSIBILITY OF MAJOR ACCIDENT |
| | 8 | THERE IS POSSIBILITY OF MINOR ACCIDENT |
| | 7 | USER HAS COMPLAINT WITH IRREGULAR SITUATION |
| | 6 | USER HAS COMPLAINT WITH STOP OF TRAVELING FUNCTION |
| | 5 | USER HAS COMPLAINT WITH DECREASE IN TRAVELING PERFORMANCE OR STOP OF ADDITIONAL FUNCTION |
| | 4 | INCONVENIENCE OF CONVENIENT FUNCTION OR LARGE NUMBER OF USERS FEEL DISCOMFORT |
| | 3 | SMALL NUMBER OF USERS FEEL DISCOMFORT |
| | 2 | EXTREMELY SMALL NUMBER OF USERS REALIZE |
| | 1 | INFLUENCE IS IGNORABLE |
| ↓ LOW | 0 | PHENOMENON THAT DOES NOT MATTER IN ALL VEHICLES |

FIG. 5

| ENGINE COMPARTMENT | FAILURE PORTION AT CRASH TEST | D |
| --- | --- | --- |
| | TEMPERATURE OF ENVIRONMENT IS HIGHER THAN OR EQUAL TO 105°C | C |
| | OTHERS | B |
| CABIN | FAILURE PORTION AT CRASH TEST | D |
| | TEMPERATURE OF ENVIRONMENT IS HIGHER THAN OR EQUAL TO 90°C | B |
| | TEMPERATURE OF ENVIRONMENT IS HIGHER THAN OR EQUAL TO 70°C AND LOWER THAN 90°C | A |
| | OTHERS | S |
| LUGGAGE | FAILURE PORTION AT CRASH TEST | D |
| | TEMPERATURE OF ENVIRONMENT IS HIGHER THAN OR EQUAL TO 90°C | B |
| | TEMPERATURE OF ENVIRONMENT IS HIGHER THAN OR EQUAL TO 70°C AND LOWER THAN 90°C | A |
| | OTHERS | S |

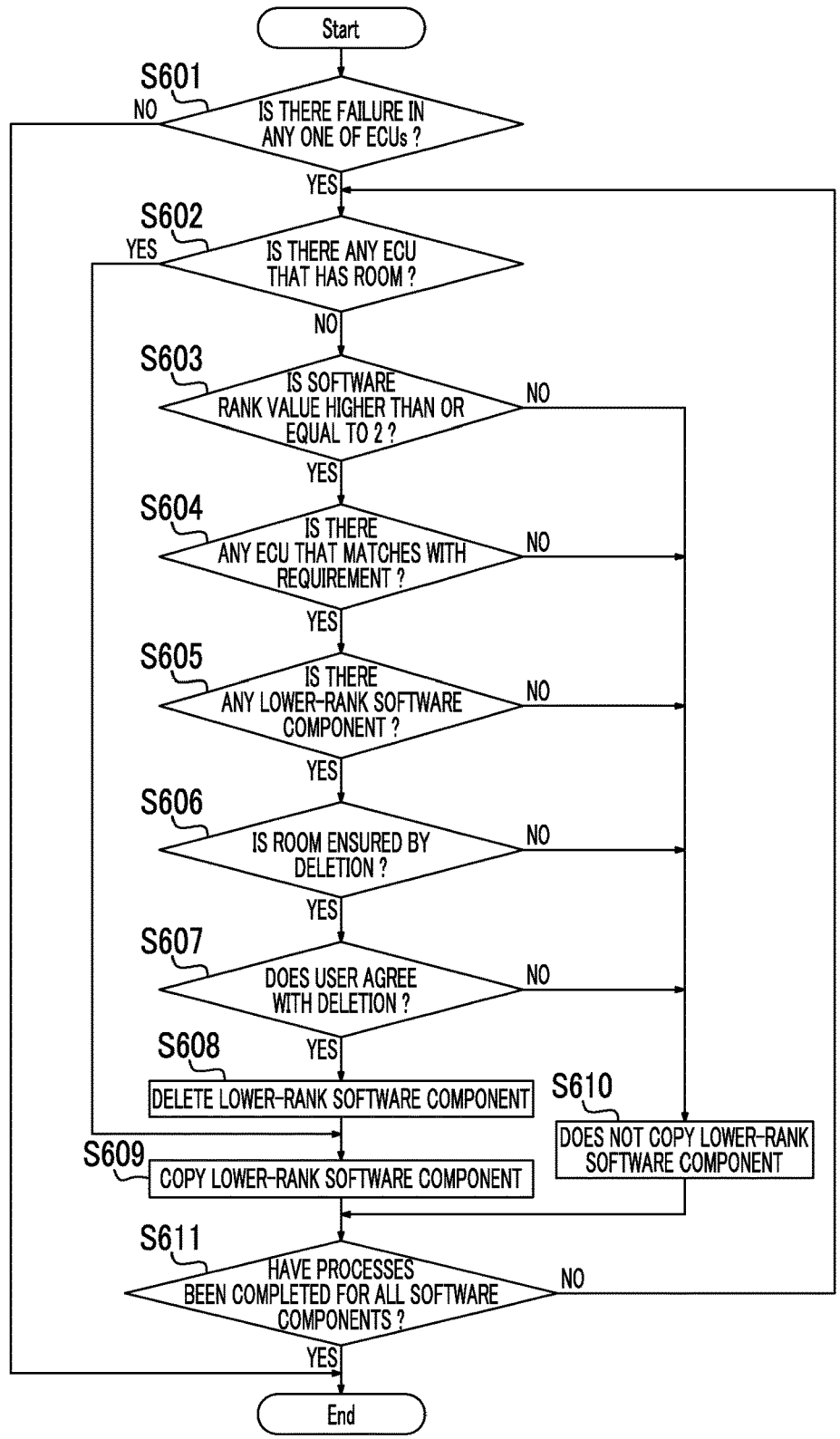

SOFTWARE COMPONENT ASSIGNING SYSTEM FOR VEHICLE

INCORPORATION BY REFERENCE

The disclosure of Japanese Patent Application No. 2016-059610 filed on Mar. 24, 2016 including the specification, drawings and abstract is incorporated herein by reference in its entirety.

BACKGROUND

1. Technical Field

The disclosure relates to the technical field of a software component assigning system for a vehicle.

2. Description of Related Art

There is known a vehicle including a plurality of electronic control units (ECUs) that are communicable with each other. In such a vehicle, a specific function is implemented by arranging a software component in any one of the ECUs. Japanese Patent Application Publication No. 2013-237311 (JP 2013-237311 A) suggests a technique for layering functions that are implemented by software components, permitting the functions in adjacent layers to be arranged in the same ECU, and prohibiting the functions in distant layers from being arranged in the same ECU. Japanese Patent Application Publication No. 2013-143093 (JP 2013-143093 A) suggests a technique for, when a plurality of software components are caused to run on a plurality of ECUs, stopping a notice of the running software component having a lower priority. Japanese Patent Application Publication No. 2008-254484 (JP 2008-254484 A) suggests a technique for, in a system including a plurality of ECUs, saving backup data received from another ECU at the time of rewriting its own data.

SUMMARY

In a system including a plurality of ECUs, when a new software component is intended to be arranged, an arrangement destination is mostly decided on the basis of the free space and processing load performance of each ECU. However, only in consideration of the free space and processing load performance of each ECU, it is difficult to arrange a software component in an appropriate ECU.

Specifically, the plurality of ECUs mounted on the vehicle respectively have different performance capabilities, and are also installed in different environments (for example, a temperature environment, a water-resistant environment, or the like), so there are various probabilities of occurrence of a malfunction. That is, there are ECUs that are relatively easy to malfunction, while there are ECUs that are relatively difficult to malfunction. In such a situation, if a software component is arranged in consideration of only the free space and processing load performance of each ECU, a software component for implementing an important function (for example, a basic software component indispensable for traveling) can be arranged in the ECU that is easy to malfunction. In this case, the robustness of the vehicle decreases.

The disclosure provides a software component assigning system for a vehicle, which is able to arrange a software component in an appropriate one of a plurality of ECUs provided in the vehicle.

A first aspect of the disclosure provides a software component assigning system for a vehicle. The software component assigning system for a vehicle, according to the first aspect of the disclosure includes: electronic control units connected to a common network in the vehicle, each of the electronic control units being configured to be able to execute control based on a software component arranged via the network, one of the electronic control units being an integrated control electronic control unit, the integrated control electronic control unit being configured to acquire a first rank value of each of the electronic control units, the first rank value becoming higher as a probability of occurrence of a malfunction is higher, acquire a second rank value of an additional software component that is additionally arranged in any one of the electronic control units, the second rank value becoming higher as a level of importance of the additional software is higher, decide an electronic control unit, in which the additional software component is arranged, from among the electronic control units such that the additional software component is arranged in the electronic control unit of which the first rank value is lower as the second rank value of the additional software component is higher, and arrange the additional software component in the decided electronic control unit.

With the software component assigning system for a vehicle according to the above aspect, since a software component is arranged in the electronic control unit of which the first rank value that indicates the probability of occurrence of a malfunction is lower (that is, a malfunction is more difficult to occur) as the second rank value of the software component, which indicates the level of importance, is higher, it is possible to improve the robustness of the vehicle.

In the first aspect, the first rank value may be set based on a location at which each of the electronic control units is installed in the vehicle.

The probability of occurrence of a malfunction in an electronic control unit significantly depends on an environment in which the electronic control unit is installed (a location at which the electronic control unit is installed). For this reason, by utilizing the location at which the electronic control unit is installed, it is possible to suitably set the first rank value.

In the first aspect, the second rank value may be set based on details of control that is executed in accordance with the additional software component.

According to this aspect, it is possible to suitably set the second rank value on the basis of the details of control that is executed in accordance with the additional software component.

In the first aspect, the integrated control electronic control unit may be configured to decide the electronic control unit, in which the additional software component is arranged, such that a response required between the additional software component and a controlled unit that is controlled by each of the electronic control units is satisfied.

According to this aspect, it is possible to arrange the additional software component in the electronic control unit that is able to achieve a high response with the controlled unit.

In the first aspect, the integrated control electronic control unit may be configured to decide the electronic control unit, in which the additional software component is arranged, such that the additional software component is arranged in the electronic control unit of which the first rank value is lower as the second rank value of the additional software component becomes higher and a communication speed required between the additional software component and an already-arranged software component already arranged in any one of the electronic control units is satisfied.

According to this aspect, it is possible to arrange the additional software component in the electronic control unit that is able to achieve a high communication speed with the already-arranged software component.

In the first aspect, the integrated control electronic control unit may be configured to decide the electronic control unit, in which the additional software component is arranged, such that the additional software component is arranged in an electronic control unit of which the first rank value is lower as the second rank value of the additional software component becomes higher and timing of supply of electric power required from the additional software component is satisfied.

According to this aspect, it is possible to arrange the additional software component in the electronic control unit that is able to supply electric power to the additional software component at appropriate timing.

The software component assigning system according to the first aspect the integrated control electronic control unit may be configured to, when the decided electronic control unit has insufficient space for arranging the additional software component, determine whether a lower-rank software component having lower second rank value than the additional software component is arranged in the decided electronic control unit, and the integrated control electronic control unit may be configured to, when the lower-rank software component is arranged in the decided electronic control unit, delete the lower-rank software component from the decided electronic control unit and arrange the additional software component in the decided electronic control unit from which the lower-rank software component has been deleted.

According to this aspect, even when the space of the ECU in which the additional software component is intended to be arranged is insufficient, it is possible to arrange the additional software component by deleting the lower-rank software component.

In the above aspect, the integrated control electronic control unit may be configured to rearrange the lower-rank software component, deleted from the decided electronic control unit, in a second one of the electronic control units, and the first rank value of the second one of the electronic control units may be higher than the first rank value of the decided electronic control unit.

In this case, since the lower-rank software component is arranged in the second one of the electronic control units, it is possible to avoid impairment of the function of the lower-rank software component.

In the first aspect, the integrated control electronic control unit may be configured to process a software component arranged in a third one of the electronic control units and determined to be copied to another one of the electronic control units due to a failure of the third one of the electronic control units as the additional software component.

According to this aspect, even when there occurs a failure in the third one of the electronic control units, in which a software component is arranged, it is possible to rearrange the software component in an appropriate one of the electronic control units.

A second aspect of the disclosure provides a software component assigning system for a vehicle. The software component assigning system for a vehicle, according to the second aspect of the disclosure includes: electronic control units connected to a common network in the vehicle, each of the electronic control units being configured to be able to execute control based on a software component arranged via the network, one of the electronic control units being an integrated control electronic control unit, the integrated control electronic control unit being configured to acquire a first rank value of each of the electronic control units, the first rank value becoming higher as a probability of occurrence of a malfunction is higher, acquire a second rank value of an additional software component to be additionally arranged in any one of the electronic control units, the second rank value becoming higher as a level of importance of the additional software is higher, decide an electronic control unit, in which the additional software component is arranged, from among the electronic control units, the electronic control unit in which the additional software component is arranged satisfying a requirement that the first rank value of the electronic control unit in which the additional software component is allowed to be arranged becomes lower as the second rank value of the additional software component is higher, and arrange the additional software component in the decide electronic control unit.

A third aspect of the disclosure provides a software component assigning system for a vehicle. The software component assigning system for a vehicle, according to the third aspect of the disclosure includes: electronic control units connected to a common network in the vehicle, each of the electronic control units being configured to be able to execute control based on a software component arranged via the network; a first acquisition unit configured to acquire a first rank value of each of the electronic control units, the first rank value becoming higher as a probability of occurrence of a malfunction is higher; a second acquisition unit configured to acquire a second rank value of an additional software component additionally arranged in any one of the electronic control units, the second rank value becoming higher as a level of importance is higher; a decision unit configured to decide an electronic control unit, in which the additional software component is arranged, from among the electronic control units, the electronic control unit in which the additional software component is arranged satisfying a requirement that the first rank value of the electronic control unit in which the additional software component is allowed to be arranged becomes lower as the second rank value of the additional software component is higher; and an arranging unit configured to arrange the additional software component in the decided electronic control unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart that shows the flow of a matching process of matching a software rank value with an ECU rank value;

FIG. 4 is a table that shows a specific example of software rank values;

FIG. 5 is a table that shows a specific example of ECU rank values;

FIG. 12 is a flowchart that shows the flow of operations of a software component assigning system for a vehicle according to a third embodiment.

DETAILED DESCRIPTION OF EMBODIMENTS

A software component assigning system for a vehicle according to embodiments of the disclosure will be described with reference to the accompanying drawings.

First Embodiment

A software component assigning system for a vehicle according to a first embodiment will be described with reference to FIG. 1 to FIG. 9. Hereinafter, the configuration of the software component assigning system for a vehicle, the overall operations of the software component assigning system for a vehicle, a matching process related to rank values, a matching process related to a coupling requirement, and technical advantageous effects that are obtained from the software component assigning system for a vehicle will be described sequentially.

Configuration of Software Component Assigning System for Vehicle

Figure 1:
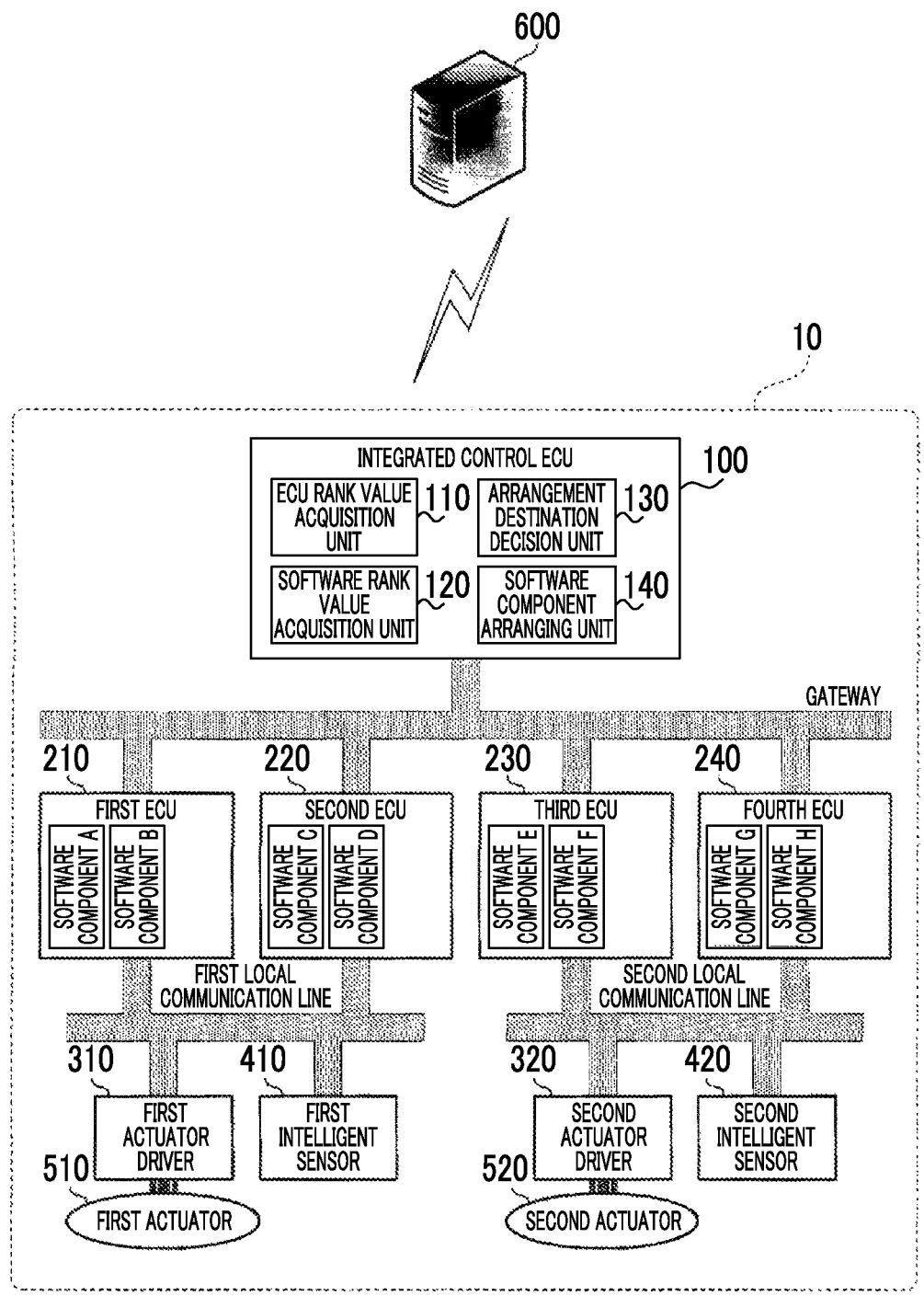
FIG. 1 is a block diagram that shows the configuration of a software component assigning system for a vehicle according to a first embodiment.

Initially, the configuration of the software component assigning system for a vehicle according to the first embodiment will be described with reference to FIG. 1. FIG. 1 is a block diagram that shows the configuration of the software component assigning system for a vehicle according to the first embodiment.

As shown in FIG. 1, the software component assigning system 10 for a vehicle according to the first embodiment is mounted on a vehicle, such as an automobile, and is configured to be wirelessly communicable with a server 600 outside the vehicle. Various pieces of information, such as new software components, are allowed to be downloaded from the server 600 outside the vehicle. The software component assigning system 10 for a vehicle includes an integrated control electronic control unit (ECU) 100, a first ECU 210, a second ECU 220, a third ECU 230, a fourth ECU 240, a first actuator driver 310, a second actuator driver 320, a first intelligent sensor 410, a second intelligent sensor 420, a first actuator 510 and a second actuator 520.

The integrated control ECU 100 is a control unit including an arithmetic circuit, such as a central processing unit (CPU). The integrated control ECU 100 is configured to be able to execute control (including status management) over each of the first ECU 210, the second ECU 220, the third ECU 230 and the fourth ECU 240 (hereinafter, these may be collectively referred to as ECUs 200, and any one of the first ECU 210, the second ECU 220, the third ECU 230 and the fourth ECU 240 may be referred to as EUC 200,). The integrated control ECU 100 includes an ECU rank value acquisition unit 110, a software rank value acquisition unit 120, an arrangement destination decision unit 130 and a software component arranging unit 140 as logical or physical processing blocks that are implemented inside the integrated control ECU 100.

The ECU rank value acquisition unit 110 is configured to be able to acquire an ECU rank value of each ECU 200. The ECU rank value indicates the probability of occurrence of a malfunction in the corresponding ECU 200 on the basis of a location at which the corresponding ECU 200 is installed in the vehicle. The ECU rank value acquired by the ECU rank value acquisition unit 110 is configured to be output to the arrangement destination decision unit 130. The ECU rank value will be described in detail later.

The software rank value acquisition unit 120 is configured to be able to acquire a software rank value. The software rank value indicates the level of importance of a software component that is arranged or that has been arranged in any one of the ECUs 200. The software rank value acquired by the software rank value acquisition unit 120 is configured to be output to the arrangement destination decision unit 130. The software rank value will be described in detail later.

The arrangement destination decision unit 130 is configured to be able to decide the arrangement destination of a software component to be arranged in any one of the ECUs 200. That is, the arrangement destination decision unit 130 decides the ECU 200, in which a software component should be arranged (hereinafter, referred to as "arrangement destination ECU" where appropriate), from among the first ECU 210, the second ECU 220, the third ECU 230 and the fourth ECU 240. A specific method of deciding the arrangement destination ECU will be described in detail later. Information about the arrangement destination ECU is configured to be output to the software component arranging unit 140.

The software component arranging unit 140 is configured to be able to execute a writing process for arranging a software component in the arrangement destination ECU. The software component arranging unit 140 is also configured to be able to execute the process of deleting a software component that has been arranged in any one of the ECUs 200.

The first ECU 210, the second ECU 220, the third ECU 230 and the fourth ECU 240 are connected to each other by a gateway. Each of the first ECU 210, the second ECU 220, the third ECU 230 and the fourth ECU 240 is connected to the integrated control ECU 100 via the gateway. That is, the integrated control ECU 100 and each ECU 200 are configured to be communicable with each other via the gateway. Each ECU 200 is a control unit that is able to execute a process based on a software component when the software component is arranged inside the ECU 200. The number of the ECUs 200 just needs to be two or more, and is not limited to four as in the case of the present embodiment.

The first actuator driver 310 is a driver configured to be able to control the first actuator 510. The second actuator driver 320 is a driver configured to be able to control the second actuator 520. The first actuator driver 310 is connected to the first ECU 210 and the second ECU 220 via a first local communication line, and controls the operation of the first actuator 510 in response to a command from these ECUs 200. On the other hand, the second actuator driver 320 is connected to the third ECU 230 and the fourth ECU 220 via a second local communication line, and controls the operation of the second actuator 520 in response to a command from these ECUs 200.

Each of the first intelligent sensor 410 and the second intelligent sensor 420 is an integrated circuit-type sensor in which a sensor and its signal processing circuit are integrated with each other, and is configured to be able to detect various pieces of information inside or outside the vehicle.

Each of the first actuator 510 and the second actuator 520 is configured to be able to perform mechanical operation in the vehicle.

Overall Operation of Software Component Assigning System for Vehicle

Figure 2:
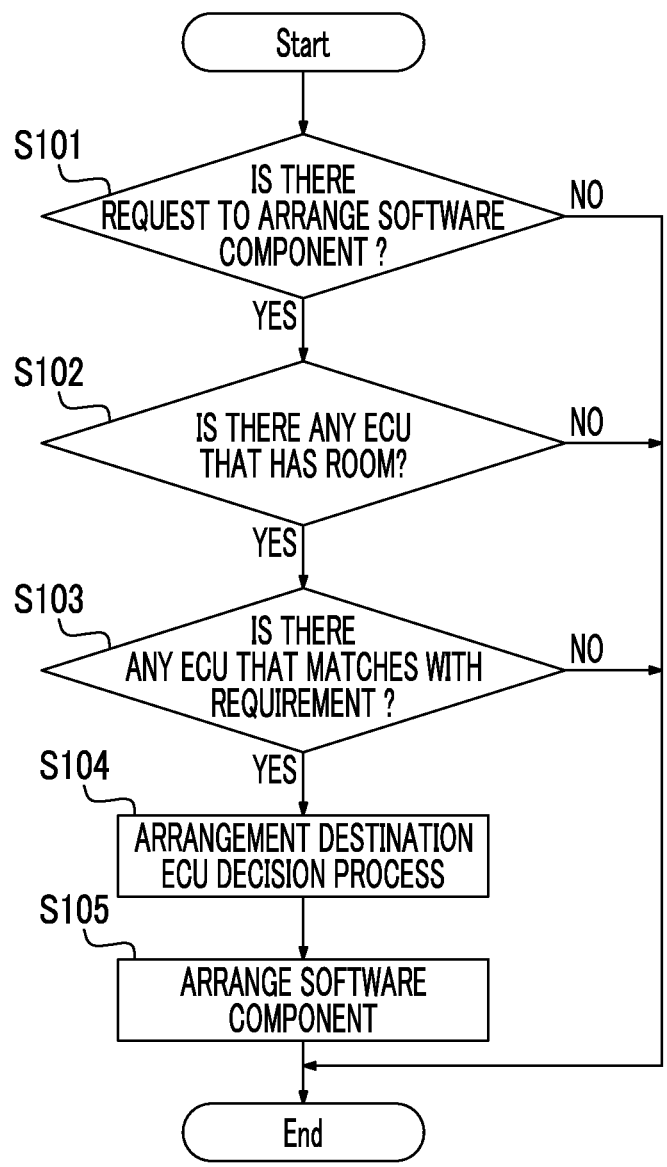
FIG. 2 is a flowchart that shows the flow of operations of the software component assigning system for a vehicle according to the first embodiment.

Next, the overall operation of the software component assigning system 10 for a vehicle according to the first embodiment will be described with reference to FIG. 2. FIG. 2 is a flowchart that shows the flow of operations of the software component assigning system for a vehicle according to the first embodiment. Processes shown in FIG. 2 are executed by the integrated control ECU 100.

As shown in FIG. 2, during operation of the software component assigning system 10 for a vehicle according to the first embodiment, initially, it is determined whether there is a request to arrange a software component in any one of the ECUs 200 (step S101). This request to arrange a software component includes not only a request in the case of installing a new software component but also a request in the case of moving a software component that has been already arranged. When there is no request to arrange a software component (NO in step S101), the following processes are cancelled, and then a series of the processes ends.

When there is a request to arrange a software component (YES in step S101), it is determined whether any one of the ECUs 200 has room for memory space and processing load (step S102). Specifically, it is determined whether there is any ECU 200 that has remaining memory space for recording a software component that is intended to be newly arranged (hereinafter, referred to as "additional software component" where appropriate) and room for processing load to such an extent that the ECU 200 is able to operate even when the additional software component is arranged. The integrated control ECU 100 executes the above determination process on the basis of, for example, management information about the ECUs 200 that are being managed by itself. When there is no ECU 200 that has room for memory space and processing load (NO in step S102), the following processes are cancelled, and then a series of the processes ends. That is, it is determined that the software component is not allowed to be arranged in any one of the ECUs 200 at the present time, and a series of the processes ends without arranging the software component in any one of the ECUs 200.

When there is the ECU(s) 200 that has room for memory space and processing load (YES in step S102), it is determined whether there is any ECU 200 that matches with a requirement for arranging the software component (step S103). Specifically, it is determined whether there is any ECU 200 of which the ECU rank value matches with the software rank value of the additional software component. The process of step S103 will be described in detail later. When there is no ECU 200 that matches with the requirement for arranging the additional software component (NO in step S103), the following processes are cancelled, and then a series of the processes ends. That is, it is determined that the software component is not allowed to be arranged in any ECU 200 at the present time, and a series of the processes ends without arranging the software component in any one of the ECUs 200.

When one or more of the ECUs 200 match with the requirement for arranging the additional software component (YES in step S103), the process for deciding the arrangement destination ECU is executed (step S104). That is, the process for deciding the ECU 200, in which the additional software component is actually arranged, from among the ECU(s) 200 that is determined in step S103 as the ECU(s) 200 that matches with the requirement for arranging the additional software component is executed. In step S104, a matching process (specifically a matching process based on a coupling requirement) different in viewpoint from the matching process that has been executed so far is further executed. The process of step S104 will be described in detail later.

When the arrangement destination ECU has been decided, the process of arranging the additional software component in the arrangement destination ECU is executed (step S105). Through the above-described processes, a software component arrangement process that is executed by the software component assigning system 10 for a vehicle ends.

Matching Process Related to Rank Values

Next, the process of step S103 in FIG. 2 (the matching process related to rank values) will be described in detail with reference to FIG. 3 to FIG. 5. FIG. 3 is a flowchart that shows the flow of a matching process of matching a software rank value with an ECU rank value. FIG. 4 is a table that shows a specific example of software rank values. FIG. 5 is a table that shows a specific example of ECU rank values.

In FIG. 3, when the process of step S103 is started, a determination as to the software rank value of the additional software component is carried out (step S201). The software rank value is, for example, a value that is decided as follows.

As shown in FIG. 4, the software rank value of a software component depends on the level of importance of the software component. The software rank value is a value that is indicated in ten levels from 0 to 9, and becomes a higher value as the level of importance of the software component is higher. The "level of importance" of a software component is a value that indicates the importance of control that is executed by the software component. In the present embodiment, the level of importance of a software component is the level of influence of an inconvenience that can occur when the software component does not operate normally. For example, the "level of importance" of a software component may depend on the level of influence on safety during traveling of the vehicle when the software component does not operate normally. For another example, the "level of importance" of a software component may depend on the level of influence on the traveling function of the vehicle when the software component does not operate normally.

In the present embodiment, specifically, the software rank value of a software component of which a malfunction can cause a major accident is "9". The software rank value of a software component of which a malfunction can cause a minor accident is "8". The software rank value of a software component of which a malfunction makes a user have a complaint with occurrence of an irregular situation is "7". The software rank value of a software component of which a malfunction makes a user have a complaint with at least a partial stop of the traveling function of the vehicle is "6". The software rank value of a software component of which a malfunction makes a user have a complaint with a decrease in the traveling performance of the vehicle or a stop of an additional function is "5". The software rank value of a software component of which a malfunction causes occurrence of trouble in a convenient function or makes a large number of users feel discomfort is "4". The software rank value of a software component of which a malfunction makes a small number of users feel discomfort is "3". The software rank value of a software component of which a malfunction makes an extremely small number of users feel discomfort is "2". The software rank value of a software component that causes an ignorable influence due to a malfunction of the software component is "1". The software rank value of a software component of which a malfunction does not matter in all the vehicles is "0".

Referring back to FIG. 3, in the determination of step S201, a process that is executed thereafter is decided in accordance with the software rank value. Specifically, the ECU(s) 200 that has room for memory space and processing load (see step S102 in FIG. 2) is searched for the ECU 200 of the ECU rank value that conforms to the software rank value. The ECU rank value is a value that is indicated in five levels from D to S. The ECU rank value of the ECU 200 is a higher value as the probability of occurrence of a malfunction in the ECU 200 is higher. The ECU rank values have a descending order of D, C, B, A, and S. A malfunction is easier to occur as the ECU rank value approaches D, and a malfunction is more difficult to occur as the ECU rank value approaches S. The "malfunction" means a state where the ECU 200 is not able to operate normally, and includes not only the case where the operation is completely stopped but also, for example, the case where part of the operation cannot be executed or the operation delays.

As shown in FIG. 5, the ECU rank value of each ECU 200 should be decided on the basis of a location (environment) at which the ECU 200 is arranged in the vehicle. Specifically, the ECU rank value of the ECU 200 that is arranged around an engine compartment is "D" in the case where the ECU 200 is arranged at a location at which a failure occurrence rate is high at a crash test, "C" in the case where the temperature of an environment can be higher than or equal to 105° C. except the case of "D", and "B" except the case of "D" or "C". The ECU rank value of the ECU 200 that is arranged around a cabin is "D" in the case where the ECU 200 is arranged at a location at which a failure occurrence rate is high at a crash test, "B" in the case where the temperature of an environment can be higher than or equal to 90° C. except the case of "D", "A" in the case where the temperature of an environment can be higher than or equal to 70° C. and lower than 90° C. except the case of "D", or "S" except the case of "D", "B" or "A". The ECU rank value of the ECU 200 that is arranged around a luggage compartment is "D" in the case where the ECU 200 is arranged at a location at which a failure occurrence rate is high at a crash test, "B" in the case where the temperature of an environment can be higher than or equal to 90° C. except the case of "D", "A" in the case where the temperature of an environment can be higher than or equal to 70° C. and lower than 90° C. except the case of "D", or "S" except the case of "D", "B" or "A".

Referring back to FIG. 3, when the software rank value is 0 or 1, the ECUs 200 are searched for the ECU(s) 200 of which the ECU rank value is any one of D to S (step S202). When the software rank value is 2 or 3, the ECUs 200 are searched for the ECU(s) 200 of which the ECU rank value is any one of C to S (step S203). When the software rank value is 4 or 5, the ECUs 200 are searched for the ECU(s) 200 of which the ECU rank value is any one of B to S (step S204). When the software rank value is 6 or 7, the ECUs 200 are searched for the ECU(s) 200 of which the ECU rank value is any one of A to S (step S205). When the software rank value is 8 or 9, the ECUs 200 are searched for the ECU(s) 200 of which the ECU rank value is S (step S206). In this way, as the software rank value of a software component that is intended to be arranged is higher, the ECU 200 having a higher ECU rank value is required as the arrangement destination ECU.

As a result of the above-described searching process of step S202 to step S206, when there is the ECU(s) 200 of which the ECU rank value matches with the software rank value (YES in step S207), it is allowed to be determined that there is the ECU(s) 200 that matches with the requirement, so affirmative determination is made in step S103. On the other hand, when there is no ECU 200 of which the ECU rank value matches with the software rank value (NO in step S207), it is allowed to be determined that there is no ECU 200 that matches with the requirement, so negative determination is made in step S103.

Matching Process Related to Coupling Requirement

Figure 6:
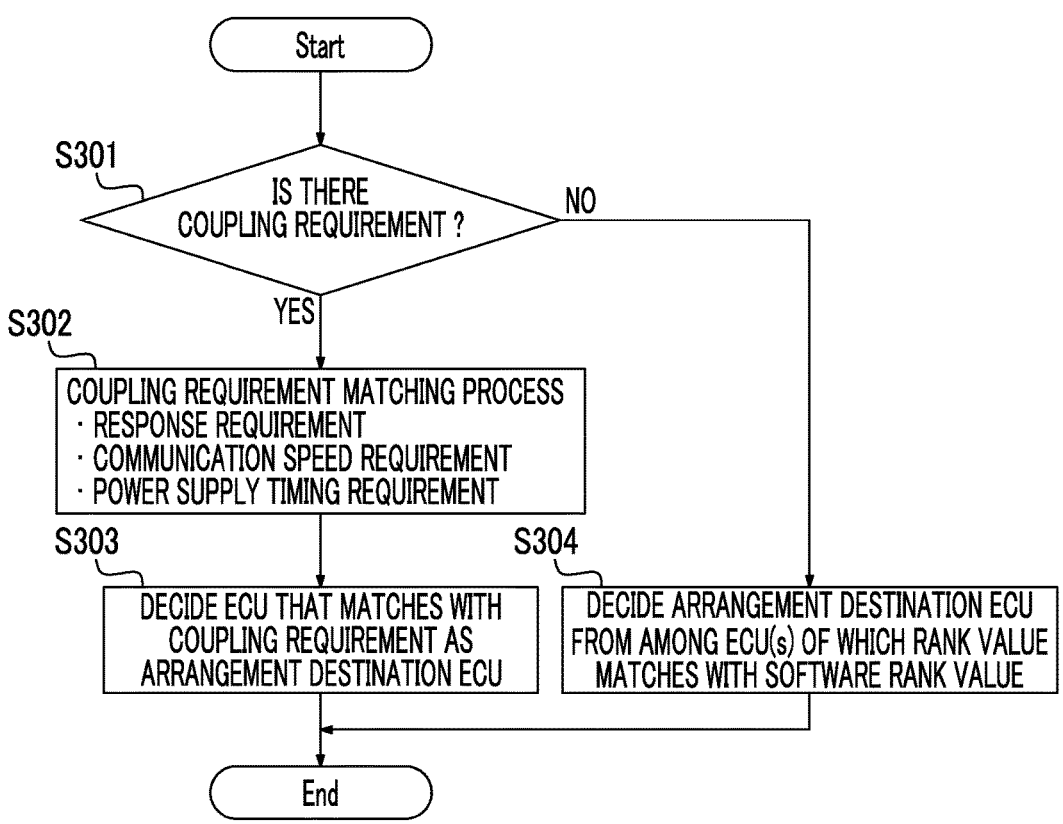
FIG. 6 is a flowchart that shows the flow of a matching process related to a coupling requirement of a software component.

Next, the process of step S104 in FIG. 2 (matching process related to a coupling requirement) will be described with reference to FIG. 6. FIG. 6 is a flowchart that shows the flow of a matching process related to a coupling requirement of a software component.

In FIG. 6, when the process of step S104 is started, it is determined whether the additional software component has a coupling requirement (step S301). The "coupling requirement" is a requirement that is imposed on a location at which the additional software component is arranged in order to execute appropriate control in relation to portions of the vehicle, which are controlled by the additional software component, in relation to another software component that has been already arranged in any one of the ECUs 200, and in relation to the operating requirement of each ECU 200. When no coupling requirement is imposed on the additional software component (NO in step S301), the arrangement destination ECU should be decided from among the ECU(s) 200 that is determined in step S103 as the ECU(s) 200 of which the ECU rank value matches with the software rank value (step S304).

When a coupling requirement is imposed on the additional software component (YES in step S301), a coupling requirement matching process for selecting the ECU(s) 200 that matches with the coupling requirement is executed (step S302). In the coupling requirement matching process according to the present embodiment, a matching process related to a response requirement, a matching process related to a communication speed requirement or a matching process related to a power supply timing requirement is executed.

In the matching process related to the response requirement, it is determined whether there is any ECU 200 that satisfies a response that is required between the additional software component and the portions (for example, the first actuator driver 310 and the second actuator driver 320, the first intelligent sensor 410 and the second intelligent sensor 420, or the like) that are controlled by the additional software component among the ECU(s) 200 that is determined in step S103 as the ECU(s) 200 of which the ECU rank value matches with the software rank value.

In the matching process related to the communication speed requirement, it is determined whether there is any ECU 200 that satisfies a communication speed that is required between the additional software component and another software component that has been already arranged in each ECU 200 among the ECU(s) 200 that is determined in step S103 as the ECU(s) of which the ECU rank value matches with the software rank value.

In the matching process related to the power supply timing requirement, it is determined whether there is any ECU 200 that satisfies power supply timing that is required of the additional software component (that is, timing at which supply of electric power is required in order to execute a process based on the additional software component) among the ECU(s) 200 that is determined in step S103 as the ECU(s) 200 of which the software rank value matches with the ECU rank value.

When the matching process related to each requirement ends, the ECU 200 determined as the ECU 200 that matches with the requirements is decided as the arrangement destination ECU (step S303). When there are a plurality of requirements, the ECU 200 that matches with all the requirements is desirably decided as the arrangement destination ECU. When there is no ECU 200 that satisfies the requirement, the ECU 200 of which the matching degree (that is, a value indicating how much the requirement is satisfied) is the highest should be decided as the arrangement destination ECU.

Figure 7:
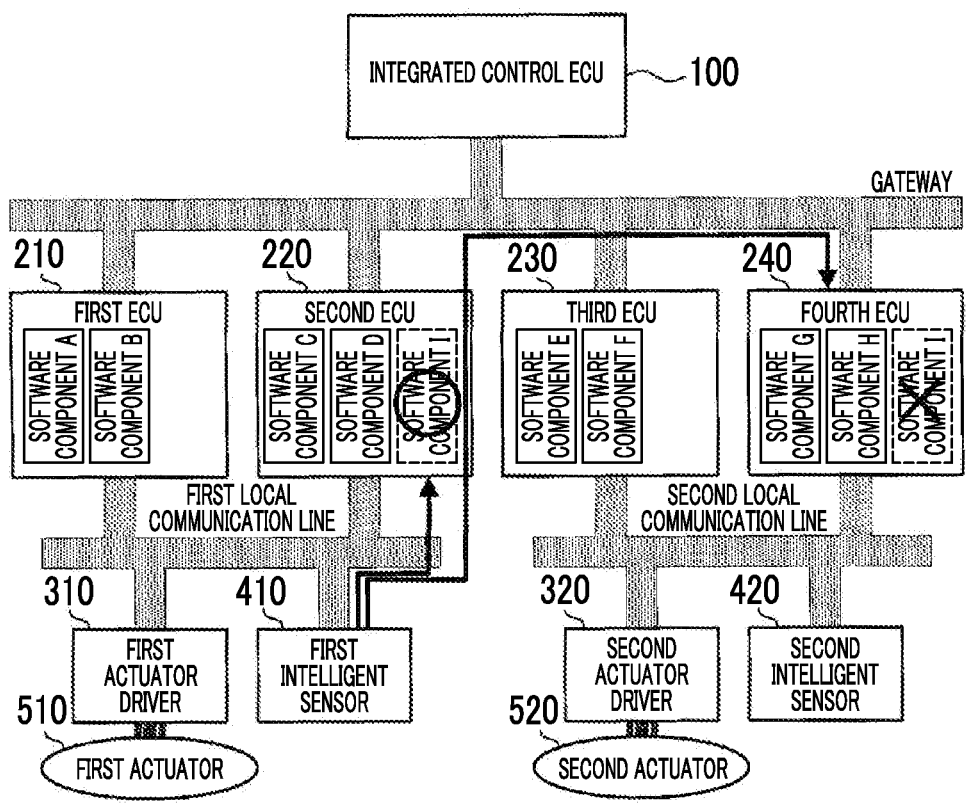
FIG. 7 is a conceptual view that shows an example of a matching process related to a response requirement.
Figure 8:
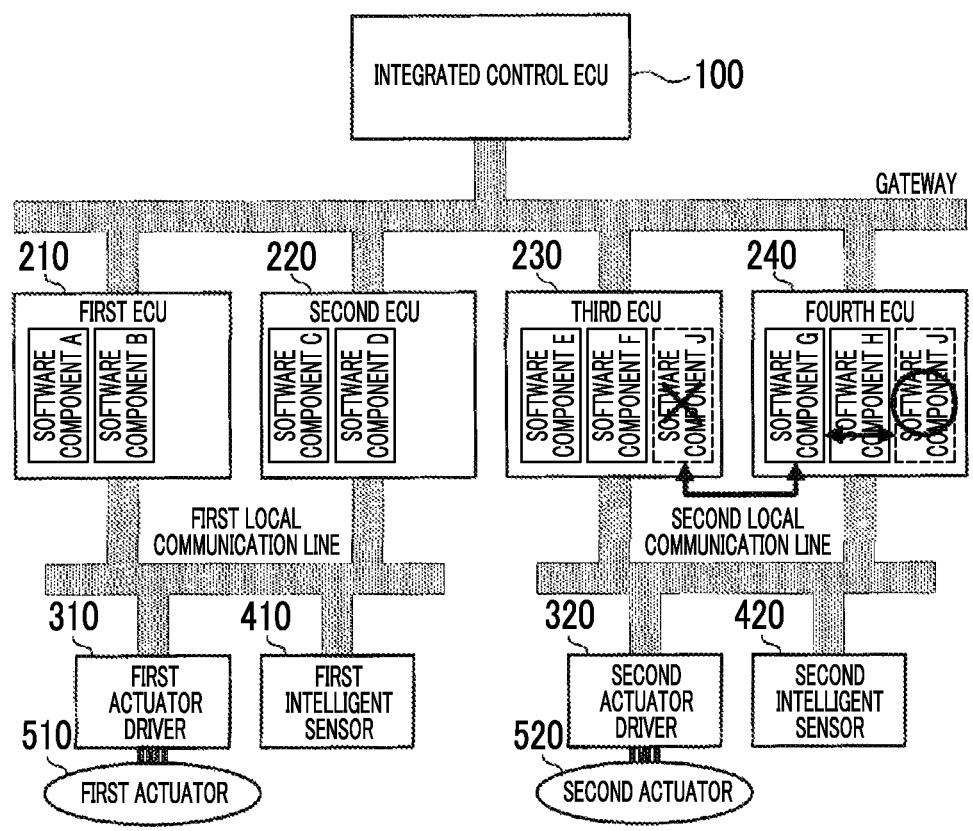
FIG. 8 is a conceptual view that shows an example of a matching process related to a communication speed requirement.
Figure 9:
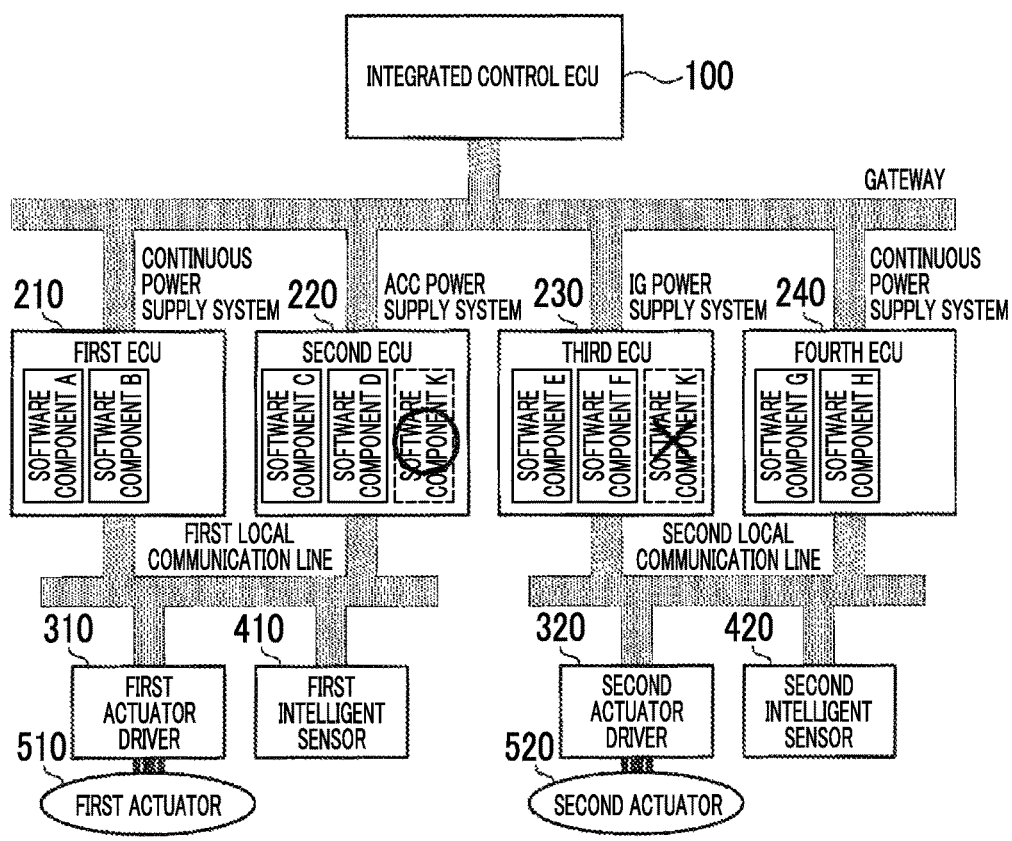
FIG. 9 is a conceptual view that shows an example of a matching process related to a power supply timing requirement.

Hereinafter, the matching processes based on the above-described various requirements will be specifically described with reference to FIG. 7 to FIG. 9. FIG. 7 is a conceptual view that shows an example of the matching process related to the response requirement. FIG. 8 is a conceptual view that shows an example of the matching process related to the communication speed requirement. FIG. 9 is a conceptual view that shows an example of the matching process related to the power supply timing requirement. In the following example, it is assumed that all the first ECU 210, second ECU 220, third ECU 230 and fourth ECU 240 are determined in the above-described process of step S103 as the ECUs 200 of which the rank values match with the requirement.

As shown in FIG. 7, the case where a new software component I is intended to be arranged on the assumption that a software component A and a software component B have been already arranged in the first ECU 210, a software component C and a software component D have been already arranged in the second ECU 220, a software component E and a software component F have been already arranged in the third ECU 230 and a software component G and a software component H have been already arranged in the fourth ECU 240 will be considered. The software component I is a software component for executing a process associated with the first intelligent sensor 410, and a high response is required between the first intelligent sensor 410 and the software component I.

In this case, when the arrangement destination ECU of the software component I is the first ECU 210 or the second ECU 220, the software component I is able to communicate with the first intelligent sensor 410 via the first local communication line. On the other hand, when the arrangement destination ECU of the software component I is the third ECU 230 or the fourth ECU 240, the software component I is not able to communicate with the first intelligent sensor 410 until communication passes through not only the first local communication line but also the gateway. When communication via the gateway is required, the response decreases as compared to when communication is possible with the use of only the first local communication line.

When the response that is required of the software component I is a response corresponding to a situation in which communication is possible with the use of only the local communication line, the ECUs 200 that satisfy the response requirement are the first ECU 210 and the second ECU 220, and the third ECU 230 and the fourth ECU 240 do not satisfy the response requirement. Thus, in this case, the first ECU 210 or the second ECU 220 is selected as the arrangement destination ECU of the software component I.

In FIG. 8, the case where a new software component J is intended to be arranged on the same assumption as the assumption of the example shown in FIG. 7 will be considered. Particularly, the software component J is a software component that executes a process in cooperation with the software component G that has been arranged in the fourth ECU 240. For this reason, a requirement that high-speed communication with the software component G is possible (that is, interprocess communication is allowed to be carried out at a high speed) is imposed on the software component J.

In this case, when the arrangement destination ECU of the software component J is the fourth ECU 240, the software component J is able to communicate with the software component G within the same ECU. On the other hand, when the arrangement destination ECU of the software component J is the third ECU 230, the software component J communicates with the software component G via the second local communication line. When the arrangement destination ECU of the software component J is the first ECU 210 or the second ECU 220, the software component J communicates with the software component G via the gateway. A communication speed between software components is highest when the software components are arranged within the same ECU, and becomes lower when the software components communicate with each other via the second local communication line or the gateway.

When the communication speed that is required of the software component J is a communication speed corresponding to the communication speed within the same ECU, the ECU 200 that satisfies the communication speed requirement is only the fourth ECU 240, and the other first ECU 210, second ECU 220 and third ECU 230 do not satisfy the communication speed requirement. Thus, in this case, the fourth ECU 240 is selected as the arrangement destination ECU of the software component J.

In FIG. 9, the case where a new software component K is intended to be arranged on the same assumption as the assumptions of the examples shown in FIG. 7 and FIG. 8 will be considered. Particularly, the software component K requires that the ECU 200 uses an ACC power supply system as power supply timing. That is, the software component K is a software component that requires electric power to be supplied at the time when ACC turns on.

The first ECU 210 and the fourth ECU 240 are the continuous power supply system ECUs 200 (that is, the ECUs 200 that are allowed to be continuously supplied with electric power). The second ECU 220 is the ACC power supply system ECU 200 (that is, the ECU 200 that is allowed to be supplied with electric power when ACC turns on). The third ECU 230 is the IG power supply system ECU 200 (that is, the ECU 200 that is allowed to be supplied with electric power when IG turns on).

Since the power supply timing that is required of the software component K is the ACC power supply system, the second ECU 220 that is included in the ACC power supply system is the ECU 200 that satisfies the requirement related to the power supply timing. The first ECU 210 and the fourth ECU 240 that are included in the continuous power supply system also satisfy the requirement related to the power supply timing. On the other hand, the third ECU 230 that is included in the IG power supply system does not satisfy the power supply timing requirement. Thus, in this case, the first ECU 210, the second ECU 220 or the fourth ECU 240 is selected as the arrangement destination ECU of the software component K.

Advantageous Effects of Embodiment

Next, technical advantageous effects that are obtained from the software component assigning system 10 for a vehicle according to the first embodiment will be described.

As described with reference to FIG. 1 to FIG. 9, with the software component assigning system 10 for a vehicle according to the first embodiment, the arrangement destination ECU is decided on the basis of not only the requirement related to memory space and processing load but also matching related to the rank values and matching related to the coupling requirement. For this reason, it is possible to suitably arrange a software component in any one of the ECUs 200.

Specifically, by executing the matching process related to the rank values, it is possible to prevent a software component having a high level of importance from being arranged in the ECU 200 of which a malfunction is easy to occur. Thus, it is possible to improve the robustness of the vehicle. By executing the matching process related to the coupling requirement, it is possible to avoid a situation in which an arranged software component is not able to appropriately operate.

In the first embodiment, the software rank value of the additional software component is not compared with the software rank values of the already-arranged software components that have been already arranged in the ECUs 200. Thus, even when the software rank value of the additional software component is higher than the software rank values of the already-arranged software components, the additional software component can be arranged in the ECU 200 of which the ECU rank value is higher (a malfunction is easier to occur) than the ECU rank values of the ECUs 200 in which the already-arranged software components have been arranged. In such a case as well, since the additional software component is arranged in the ECU 200 of which the ECU rank value is lower (a malfunction is more difficult to occur) among the ECUs 200 in which a new software component is allowed to be arranged, the above-described technical advantageous effects are exhibited.

Second Embodiment

Next, a software component assigning system for a vehicle according to a second embodiment will be described. The second embodiment differs from the already described first embodiment only in part of operations, and substantially similar in system configuration and other many portions to the first embodiment. For this reason, portions different from the first embodiment will be described in detail, and the description of other overlap portions is omitted as needed.

Overall Operation of Software Component Assigning System for Vehicle

Figure 10:
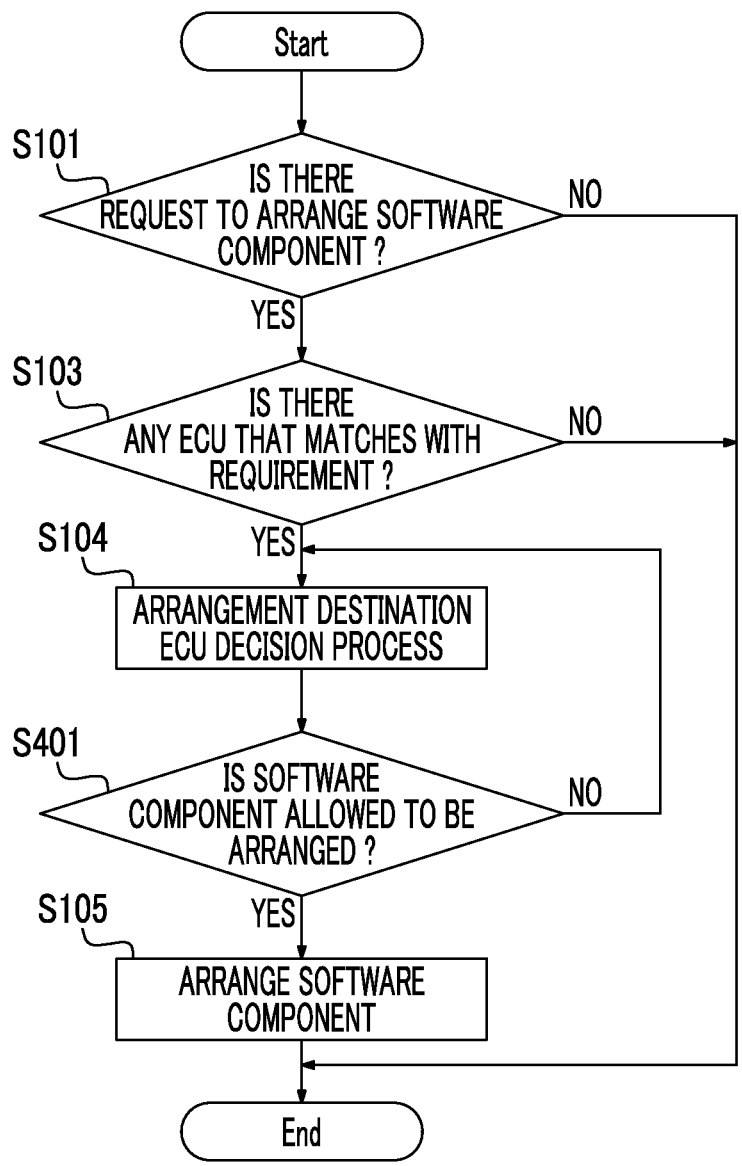
FIG. 10 is a flowchart that shows the flow of operations of a software component assigning system for a vehicle according to a second embodiment.

Initially, the overall operation of the software component assigning system 10 for a vehicle according to the second embodiment will be described with reference to FIG. 10. FIG. 10 is a flowchart that shows the flow of operations of the software component assigning system for a vehicle according to the second embodiment. In FIG. 10, like step numbers denote processes similar to those described in FIG. 2, and the detailed description thereof is omitted as needed.

As shown in FIG. 10, during operation of the software component assigning system 10 for a vehicle according to the second embodiment, initially, it is determined whether there is a request to arrange a software component in any one of the ECUs 200 (step S101). When there is no request to arrange a software component (NO in step S101), the following processes are cancelled, and then a series of the processes ends.

When there is a request to arrange a software component (YES in step S101), it is determined whether there is any ECU 200 that matches with a requirement for arranging the software component (step S103). That is, the matching process related to the rank values, described in FIG. 3, is executed. When there is no ECU 200 that matches with the condition for arranging the software component (NO in step S103), the following processes are cancelled, and then a series of the processes ends. That is, it is determined that the software component is not allowed to be arranged in any ECU 200 at the present time, and a series of the processes ends without arranging the software component in any one of the ECUs 200.

As is apparent from the above-described operations, step S102 (see FIG. 2) in the first embodiment is omitted in the second embodiment. That is, at this stage, it is not determined whether there is any ECU 200 that has room for memory space and processing load.

When there is any ECU 200 that matches with the requirement for arranging the additional software component (YES in step S103), the process for deciding the arrangement destination ECU is executed (step S104). That is, the matching process related to the coupling requirement, described with reference to FIG. 6, is executed.

When the arrangement destination ECU is decided, it is determined whether the software component is allowed to be arranged in the arrangement destination ECU (step S401). The process of step S401 is a process including a determination as to memory space and processing load (that is, a similar process to that of step S102). The specific details of the process of step S401 will be described later.

When it is determined that the software component is not allowed to be arranged in the arrangement destination ECU (NO in step S401), the process of step S104 is executed again, and a new arrangement destination ECU is decided. However, the ECU(s) 200 that is determined in step S401 as the ECU(s) 200 in which the software component is not allowed to be arranged is omitted from candidates for a new arrangement destination ECU at the time when step S104 is executed for the second time or later. When it is determined that the software component is not allowed to be arranged in all the ECUs 200, exceptional handling may be executed. In the exceptional handling, the processes following step S104 are not repeated, and a series of the processes ends.

When it is determined that the software component is allowed to be arranged in the arrangement destination ECU (YES in step S401), the process of arranging the additional software component in the arrangement destination ECU is executed (step S105). Through the above-described processes, a software component arrangement process that is executed by the software component assigning system 10 for a vehicle ends.

Arrangement Availability Determination Process for Software Component

Figure 11:
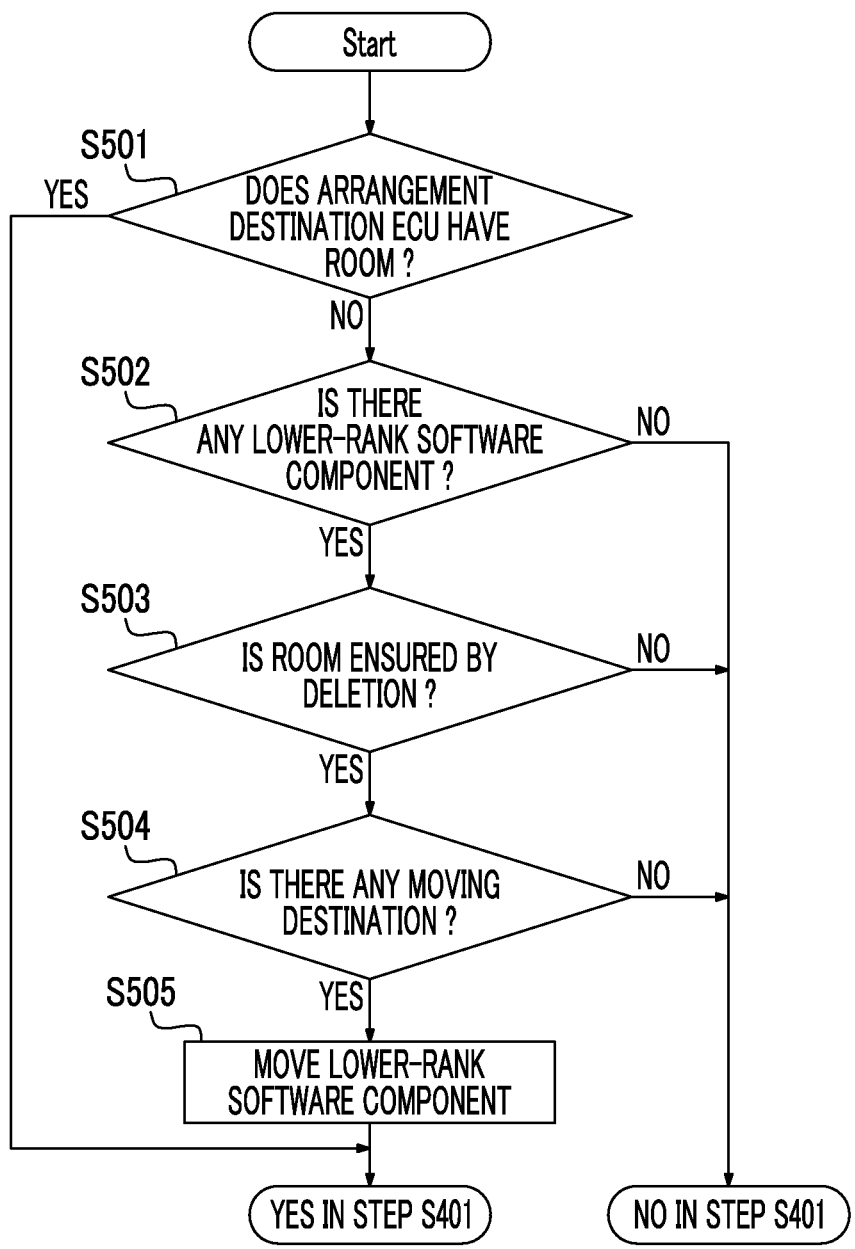
FIG. 11 is a flowchart that shows the flow of an arrangement availability determination process for a software component.

Next, the process of step S401 (arrangement availability determination process for a software component) that is a process that is peculiar to the second embodiment will be described with reference to FIG. 11. FIG. 11 is a flowchart that shows the flow of the arrangement availability determination process for a software component.

In FIG. 11, in the arrangement availability determination process for a software component, it is determined whether the arrangement destination ECU has room for memory space and processing load to arrange the additional software component (step S501). That is, a similar process to that of step S102 (see FIG. 2) of the first embodiment is executed only for the arrangement destination ECU. When it is determined that the arrangement destination ECU has room to arrange the additional software component (YES in step S501), the following processes are omitted, and affirmative determination is made in step S401. This is because, when the arrangement destination ECU has room to arrange the additional software component, it is allowed to arrange the additional software component without any difficulty.

When it is determined that the arrangement destination ECU has no room to arrange the additional software component (NO in step S501), it is determined whether there is any lower-rank software component having a lower software rank value (that is, a lower level of importance) than the additional software component (step S502). When there is no lower-rank software component in the arrangement destination ECU (NO in step S502), it is determined that the additional software component is not allowed to be arranged in the arrangement destination ECU, and negative determination is made in step S401.

When there is a lower-rank software component in the arrangement destination ECU (YES in step S502), it is determined whether the additional software component is allowed to be arranged by deleting the lower-rank software component from the arrangement destination ECU (step S503). That is, it is determined whether the arrangement destination ECU has room for memory space and processing load as a result of deleting the lower-rank software component. When there are a plurality of lower-rank software components in the arrangement destination ECU, it just needs to be determined whether the additional software component is allowed to be arranged as a result of deleting all the lower-rank software components. When it is determined that the additional software component is not allowed to be arranged even by deleting the lower-rank software component (NO in step S503), it is determined that the additional software component is not allowed to be arranged in the arrangement destination ECU, and negative determination is made in step S401.

When it is determined that the additional software component is allowed to be arranged if the lower-rank software component is deleted (YES in step S503), it is determined whether there is any ECU 200 that is a moving destination of the lower-rank software component (step S504). That is, it is determined whether there is another ECU 200 in which the lower-rank software component is allowed to be rearranged. In the process of step S504, the process of deciding an arrangement destination ECU (that is, the processes of step S101 to step S104 in FIG. 2 or the processes of step S101 to step S401 in FIG. 10) just needs to be executed on the assumption that the lower-rank software component is an additional software component. When it is determined that there is no moving destination of the lower-rank software component (NO in step S504), it is determined that the additional software component is not allowed to be arranged in the arrangement destination ECU, and negative determination is made in step S401.

When it is determined that there is a moving destination of the lower-rank software component (YES in step S504), moving (that is, rearranging) the lower-rank software component is executed (step S505). Thus, the arrangement destination ECU has room to arrange the additional software component, so affirmative determination is made in step S401.

Advantageous Effects of Embodiment

Next, technical advantageous effects that are obtained from the software component assigning system 10 for a vehicle according to the second embodiment will be described.

As described with reference to FIG. 10 and FIG. 11, with the software component assigning system 10 for a vehicle according to the second embodiment, even when the arrangement destination ECU has no room to arrange the additional software component, but when the lower-rank software component is allowed to be rearranged, the arrangement destination ECU has room to arrange the additional software component accordingly. Thus, it is possible to arrange the additional software component in a further appropriate ECU 200.

Since the lower-rank software component is a software component having a lower software rank value (that is, a lower level of importance) than the additional software component, no inconvenience occurs even when the lower-rank software component is rearranged in another ECU 200. More accurately, when viewed as an overall system, the adverse influence from the inconvenience of rearranging the lower-rank software component is smaller than the adverse influence from the inconvenience of not being allowed to arrange the additional software component in the arrangement destination ECU.

As described above, with the software component assigning system 10 for a vehicle according to the second embodiment, it is possible to arrange a software component further suitably as compared to the first embodiment.

Third Embodiment

Next, a software component assigning system for a vehicle according to a third embodiment will be described. The third embodiment differs from the already described first and second embodiments only in part of operations, and substantially similar in system configuration and other many portions to the first and second embodiments. For this reason, portions different from the first or second embodiment will be described in detail, and the description of other overlap portions is omitted as needed.

Overall Operation of Software Component Assigning System for Vehicle

The overall operation of the software component assigning system 10 for a vehicle according to the third embodiment will be described with reference to FIG. 12.

FIG. 12 is a flowchart that shows the flow of operations of the software component assigning system for a vehicle according to the third embodiment. Processes shown in FIG. 12 are executed by the integrated control ECU 100.

In FIG. 12, during operation of the software component assigning system 10 for a vehicle according to the third embodiment, it is determined whether there is a failure in any one of the ECUs 200 (step S601). The "failure" means a failure to such an extent that the software component that has been arranged in the ECU 200 is not able to work normally. When there is no failure in any ECU 200 (NO in step S601), the following processes are omitted, and a series of the processes ends.

When there is a failure in any one of the ECUs 200, the software component that is arranged in the any one of the ECUs 200 does not work normally in that situation. In this case, if the software component arranged in the failed ECU 200 is copied to another one of the ECUs 200 (that is, non-failed ECU 200), it is possible to cause the software component to work normally. In the third embodiment, the processes following step S602 are executed for the software component to be copied. When there are a plurality of software components in the failed ECU 200, the processes following step S602 should be executed for each of the plurality of software components.

When there is a failure in any one of the ECUs 200 (YES in step S601), it is determined whether there is any ECU 200 that has room for the software component to be copied (hereinafter, referred to as copying software component as needed) (step S602).

That is, as in the case of step S102 (see FIG. 2) according to the first embodiment, it is determined whether there is any ECU 200 that has room for memory space and processing load. When it is determined that there is the ECU 200 into which the copying software component is allowed to be copied (YES in step S602), the copying software component is copied into the ECU 200 having the room (step S609).

When it is determined that there is no ECU 200 into which the copying software component is allowed to be copied (NO in step S602), it is determined whether the software rank value of the copying software component is higher than or equal to 2 (step S603). When it is determined that the software rank value of the copying software component is lower than 2 (NO in step S603), it is determined not to copy the copying software component (step S610). That is, since the software rank value is extremely low, it is determined that no inconvenience occurs even when the copying software component is not copied (that is, the copying software component is not caused to work normally).

When it is determined that the software rank value of the copying software component is higher than or equal to 2 (YES in step S603), it is determined whether there is any ECU 200 that matches with a requirement for arranging the copying software component (step S604). That is, as in the case of the process of step S103 (see FIG. 3) of the first embodiment, the matching process related to the rank values is executed. In addition to the matching process related to the rank values, the matching process related to the coupling requirement as described with reference to FIG. 6 may be executed. When there is no ECU 200 that matches with the requirement for arranging the copying software component (NO in step S604), it is determined that there is no ECU 200 in which the copying software component is allowed to be arranged. As a result, it is determined not to copy the copying software component (step S610).

When there is the ECU 200 that matches with the requirement for arranging the copying software component (YES in step S604), it is determined whether there is any lower-rank software component that is lower in software rank value than the copying software component in any one of the ECUs 200 that match with the requirement (step S605). When there is no lower-rank software component in any one of the ECUs 200 that match with the requirement (NO in step S605), it is allowed to be determined that there is no ECU 200 in which the copying software component is allowed to be arranged. As a result, it is determined not to copy the copying software component (step S610).

When there is a lower-rank software component in any one of the ECUs 200 that match with the requirement (YES in step S605), it is determined whether the copying software component is allowed to be arranged by deleting the lower-rank software component from the any one of the ECUs 200 that match with the requirement (step S606). That is, it is determined whether it is allowed to ensure the memory space and processing load of the any one of the ECUs 200 that match with the requirement by deleting the lower-rank software component. When there are a plurality of lower-rank software components in the any one of the ECUs 200 that match with the requirement, it should be determined whether the copying software component is allowed to be arranged by deleting all the lower-rank software components. When it is determined that the copying software component is not allowed to be arranged even by deleting the lower-rank software component (NO in step S606), it is allowed to be determined that there is no ECU 200 in which the copying software component is allowed to be arranged. As a result, it is determined not to copy the copying software component (step S610).

When it is determined that the copying software component is allowed to be arranged if the lower-rank software component is deleted (YES in step S606), it is determined whether a user of the system agrees to deletion of the lower-rank software component (step S607). This agreement may be verified at this point in time or may be verified in advance (for example, at the time when the lower-rank software component is arranged). When the user of the system does not agree to deletion of the lower-rank software component (NO in step S607), it is allowed to be determined that there is no ECU 200 in which the copying software component is allowed to be arranged. As a result, it is determined not to copy the copying software component (step S610).

When the user of the system agrees to deletion of the lower-rank software component (YES in step S607), the lower-rank software component is deleted (step S608). As described in the second embodiment, the deleted lower-rank software component may be rearranged in another ECU 200. As deletion of the lower-rank software component completes, the copying software component is copied into the ECU 200 from which the lower-rank software component has been deleted (step S609).

After the copying software component is copied or after it is determined not to copy the copying software component, it is determined whether the processes following step S602 have been completed for all the copying software components (that is, all the software components that had been arranged in the failed ECU 200) (step S611). When the processes following step S602 have not been completed for all the copying software components (NO in step S611), the processes following step S602 are executed for the remaining software components for which the processes following step S602 have not been completed. When the processes following step S602 have been completed for all the copying software components (YES in step S611), a series of processes that are executed by the software component assigning system 10 for a vehicle according to the third embodiment ends.

Advantageous Effects of Embodiment

Lastly, technical advantageous effects that are obtained from the software component assigning system 10 for a vehicle according to the third embodiment will be described.

As described with reference to FIG. 12, with the software component assigning system 10 for a vehicle according to the third embodiment, even when there is a failure in any one of the ECUs 200 and the any one of the ECUs 200 is not able to exhibit the functions of software components normally, it is possible to recover the normal functions by copying the software components arranged in the failed ECU 200 to another normal ECU 200.

In copying the software components arranged in the failed ECU 200, it is determined whether the destination ECU 200 matches with various requirements as in the case of the first and second embodiments. For this reason, it is possible to prevent a software component from being copied to an inappropriate ECU 200. In addition, as in the case of the second embodiment, since it is determined whether a lower-rank software component is allowed to be deleted, it is possible to copy a software component to a further appropriate ECU.

The disclosure is not limited to the above-described embodiments. The above-described embodiments may be modified as needed without departing from the scope or concept of the disclosure, which can be read from the entire specification. The technical scope of the disclosure also encompasses a software component assigning system for a vehicle with such modifications.

For example, in the above-described embodiments, the integrated control ECU 100 mounted on the vehicle assigns a software component. Instead, the server 600 outside the vehicle may assign a software component.

What is claimed is:

1. A software component assigning system for a vehicle, the software component assigning system comprising:
   electronic control units connected to a common network in the vehicle, each of the electronic control units being configured to be able to execute control based on a software component arranged via the network, one of the electronic control units being an integrated control electronic control unit, the integrated control electronic control unit being configured to:
   acquire a first rank value of each of the electronic control units, the first rank value becoming higher as a probability of occurrence of a malfunction is higher;
   acquire a second rank value of an additional software component that is additionally arranged in any one of the electronic control units, the second rank value becoming higher as a level of importance of the additional software is higher;
   identify a predetermined range of first rank values of the electronic control units based on the second rank value;
   search for electronic control units having respective first rank values that are within the predetermined range of first rank values;
   decide an electronic control unit, in which the additional software component is arranged, from among the electronic control units such that the additional software component is arranged in the electronic control unit of which the first rank value is lower as the second rank value of the additional software component is higher; and
   arrange the additional software component in the decided electronic control unit based on searching for the electronic control units having the respective first rank values that are within the predetermined range of first rank values.

2. The software component assigning system according to claim 1, wherein:
   the first rank value is set based on a location at which each of the electronic control units is installed in the vehicle.

3. The software component assigning system according to claim 1, wherein:
   the second rank value is set based on details of control that is executed in accordance with the additional software component.

4. The software component assigning system according to claim 1, wherein:
   the integrated control electronic control unit is configured to decide the electronic control unit, in which the additional software component is arranged, such that a response required between the additional software component and a controlled unit that is controlled by each of the electronic control units is satisfied.

5. The software component assigning system according to claim 1, wherein:
   the integrated control electronic control unit is configured to decide the electronic control unit, in which the additional software component is arranged, such that the additional software component is arranged in the electronic control unit of which the first rank value is lower as the second rank value of the additional software component becomes higher and a communication speed required between the additional software component and an already-arranged software component already arranged in any one of the electronic control units is satisfied.

6. The software component assigning system according to claim 1, wherein:
   the integrated control electronic control unit is configured to decide the electronic control unit, in which the additional software component is arranged, such that the additional software component is arranged in an electronic control unit of which the first rank value is lower as the second rank value of the additional software component becomes higher and timing of supply of electric power required from the additional software component is satisfied.

7. The software component assigning system according to claim 1, wherein:
   the integrated control electronic control unit is configured to, when the decided electronic control unit has insufficient space for arranging the additional software component, determine whether a lower-rank software component having lower second rank value than the additional software component is arranged in the decided electronic control unit, and
   the integrated control electronic control unit is configured to, when the lower-rank software component is arranged in the decided electronic control unit, delete the lower-rank software component from the decided electronic control unit and arrange the additional software component in the decided electronic control unit from which the lower-rank software component has been deleted.

8. The software component assigning system according to claim 7, wherein:
   the integrated control electronic control unit is configured to rearrange the lower-rank software component, deleted from the decided electronic control unit, in a second one of the electronic control units, and the first rank value of the second one of the electronic control units is higher than the first rank value of the decided electronic control unit.

9. The software component assigning system according to claim 1, wherein:
   the integrated control electronic control unit is configured to process a software component arranged in a third one of the electronic control units and determined to be copied to another one of the electronic control units due to a failure of the third one of the electronic control units as the additional software component.

10. A software component assigning system for a vehicle, the software component assigning system comprising:
    electronic control units connected to a common network in the vehicle, each of the electronic control units being configured to be able to execute control based on a software component arranged via the network, one of the electronic control units being an integrated control electronic control unit, the integrated control electronic control unit being configured to:
    acquire a first rank value of each of the electronic control units, the first rank value becoming higher as a probability of occurrence of a malfunction is higher;

acquire a second rank value of an additional software component to be additionally arranged in any one of the electronic control units, the second rank value becoming higher as a level of importance of the additional software is higher;

identify a predetermined range of first rank values of the electronic control units based on the second rank value;

search for electronic control units having respective first rank values that are within the predetermined range of first rank values;

decide an electronic control unit, in which the additional software component is arranged, from among the electronic control units, the electronic control unit in which the additional software component is arranged satisfying a requirement that the first rank value of the electronic control unit in which the additional software component is allowed to be arranged becomes lower as the second rank value of the additional software component is higher; and arrange the additional software component in the decided electronic control unit based on searching for the electronic control units having the respective first rank values that are within the predetermined range of first rank values.

11. A software component assigning system for a vehicle, the software component assigning system comprising:

electronic control units connected to a common network in the vehicle, each of the electronic control units being configured to be able to execute control based on a software component arranged via the network; and one or more processors configured to:

acquire a first rank value of each of the electronic control units, the first rank value becoming higher as a probability of occurrence of a malfunction is higher;

acquire a second rank value of an additional software component additionally arranged in any one of the electronic control units, the second rank value becoming higher as a level of importance is higher;

identify a predetermined range of first rank values of the electronic control units based on the second rank value;

search for electronic control units having respective first rank values that are within the predetermined range of first rank values;

decide an electronic control unit, in which the additional software component is arranged, from among the electronic control units, the electronic control unit in which the additional software component is arranged satisfying a requirement that the first rank value of the electronic control unit in which the additional software component is allowed to be arranged becomes lower as the second rank value of the additional software component is higher; and arrange the additional software component in the decided electronic control unit based on searching for the electronic control units having the respective first rank values that are within the predetermined range of first rank values.

* * * * *